United States Patent
Otterbach et al.

(10) Patent No.: US 6,943,669 B2
(45) Date of Patent: Sep. 13, 2005

(54) METHOD FOR TRANSMITTING DATA FROM AT LEAST ONE SENSOR TO A CONTROL UNIT

(75) Inventors: Jens Otterbach, Wenden (DE); Christian Ohl, Reutlingen (DE); Oliver Kohn, Reutlingen (DE); Gerald Nitsche, Gammertingen (DE); Jochen Schomacker, Reutlingen (DE); Ingbert Gerngross, Reutlingen (DE); Dirk Ullmann, Reutlingen (DE); Michael Ulmer, Moessingen (DE)

(73) Assignee: Robert Bosch GmbH, Stuttgart (DE)

(*) Notice: Subject to any disclaimer, the term of this patent is extended or adjusted under 35 U.S.C. 154(b) by 411 days.

(21) Appl. No.: 10/112,545

(22) Filed: Mar. 29, 2002

(65) Prior Publication Data

US 2003/0184447 A1 Oct. 2, 2003

(51) Int. Cl.[7] .................. B60Q 1/00; G08B 26/00; G08B 29/00; H04M 11/04; G05B 11/01; G05D 9/00

(52) U.S. Cl. .................. 340/310.02; 340/438; 340/505; 340/506; 340/514; 701/45; 700/3; 700/14; 700/17; 700/45; 700/83; 700/295; 700/297

(58) Field of Search .................. 340/438, 505–514, 340/310.02; 700/3, 14–17, 83, 295–297; 701/45

(56) References Cited

U.S. PATENT DOCUMENTS 4,788,527 A * 11/1988 Johansson .............. 340/310.02
5,117,219 A * 5/1992 Tice et al. .................. 340/518
5,357,141 A  10/1994 Nitschke et al.
5,606,513 A  2/1997 Louwagie et al.
5,737,335 A * 4/1998 Mizuta et al. .............. 370/444
6,188,314 B1 * 2/2001 Wallace et al. ............. 340/438
6,233,285 B1  5/2001 Beaudoin et al.
6,345,220 B1 * 2/2002 Ikegami ...................... 701/45

FOREIGN PATENT DOCUMENTS

| DE | 38 11 217 | 10/1989 |
| DE | 42 01 577 | 7/1993 |
| DE | 196 09 290 | 4/1997 |
| DE | 196 29 868 | 2/1998 |
| DE | 197 30 158 | 2/1999 |
| DE | 199 00 105 | 7/2000 |
| DE | 199 45 614 | 12/2000 |
| JP | 04-129000 | 4/1992 |
| WO | WO 92/07505 | 5/1992 |
| WO | WO 97/38408 | 10/1997 |

OTHER PUBLICATIONS

E. Ullmann et al., "Side Airbag Sensor in Silicon Micromachining", SAE Technical Paper Series, Mar. 1999.

* cited by examiner

Primary Examiner—Jeffery Hofsass
Assistant Examiner—Lam Pham
(74) Attorney, Agent, or Firm—Kenyon & Kenyon

(57) ABSTRACT

A method for transmitting data from at least one sensor to a control unit via an appropriate two-wire line is described. The method is used to identify any sensor at the control unit and to implement a plurality of logical channels via the appropriate two-wire line. The at least one sensor receives the necessary electrical energy from the control unit via the two-wire line and then transmits the sensor-specific data.

11 Claims, 4 Drawing Sheets

Fig. 3

| Field | Length (words) | Information | Meaning |
|---|---|---|---|
| 1 | 1 | Transmission format | Protocol, length of ID block, ID and useful data format |
| 2 | 1 | Manufacturer ID | Sensor or chip manufacturer |
| 3 | 1 | Sensor family | Sensor type (acceleration, pressure, steering angle) |
| 4 | tbd | Sensor ID | Sensor type (measuring range, sensing axis, etc.) |
| 5 | tbd | Sensorstatus | Production progress, good/bad identification |
| 6 | tbd | Sensorinformation | Manufacturing date, batch, serial number, etc. |

Fig. 4

| Type | Channels | Resolution | Date Rate | Use |
|---|---|---|---|---|
| A1 | 1 | 10Bit | 4kHz | High data rate (PAS4, UFS2, satellite pressure sensor) |
| B1 | 1 | 12-16Bit | 2kHz | High resolution (inclination sensor, displacement sensor) |
| A2 | 2 | 8Bit | 2kHz | 2-channel transmission |
| B2 | 2 | 12-16Bit | 1kHz | 2-channel transmission with high resolution (rate of rotation/low acceleration) |
| A4 | 4 | 8Bit | 1kHz | 4-channel transmission (e.g. temperature, moisture, pressure) |

Fig. 5

2 start bits
10 bits of useful date
1 parity bit

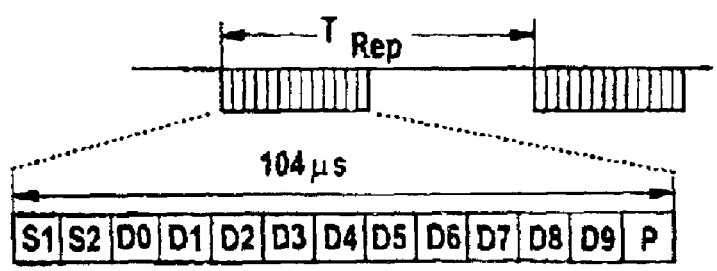

| Decimal | Hexadecimal | Meaning | Range |
|---|---|---|---|
| +511 | 1FF | Reserved | |
| :: | | Reserved | |
| +508 | 1FC | Reciever Manchester Error | |
| :: | | Reserved | Status messages |
| +504 | 1F8 | Reciever Parity Error | (+481..+511) |
| :: | | Reserved | |
| +500 | 1F4 | Sensor Defekt | |
| :: | | Reserved | |
| +496 | 1F0 | Reciever Buffer Empty | |
| :: | | Reserved | |
| +481 | 1E1 | Reserved | |
| +480 | 1E0 | Highest Positive Data Value | |
| +479 | 1DF | 2nd Highest Positive Data Value | |
| :: | | | Useful data |
| 0 | | | (-480..+480) |
| :: | | | |
| -479 | 221 | 2nd Lowest Negative Data Value | |
| -480 | 220 | Lowest Negative Data Value | |
| -481 | 21F | Reserved | |
| :: | | Reserved | |
| -495 | 211 | Sensor Ready | |
| -496 | 210 | Reserved | |
| -497 | 20F | Reserved | |
| -498 | 20E | ID16 | |
| -499 | 20D | ID15 | |
| -500 | 20C | ID14 | |
| -501 | 20B | ID13 | Status messages |
| -502 | 20A | ID12 | (-481..-512) |
| -503 | 210 | ID11 | |
| -504 | 209 | ID10 | |
| -505 | 208 | ID09 | |
| -506 | 207 | ID08 | |
| -507 | 206 | ID07 | |
| -508 | 205 | ID06 | |
| -509 | 204 | ID05 | |
| -510 | 203 | ID04 | |
| -511 | 202 | ID03 | |
| -511 | 201 | ID02 | |
| -512 | 200 | ID01 | |

METHOD FOR TRANSMITTING DATA FROM AT LEAST ONE SENSOR TO A CONTROL UNIT

FIELD OF THE INVENTION

The present invention relates to a method for transmitting data from at least one sensor to a control unit.

BACKGROUND INFORMATION

An article by D. Ullmann et al.: "Side Airbag Sensor in Silicon Micromachining" SAE Technical Paper, March 1999 describes transmitting data from separately situated sensors in a motor vehicle to a control unit via a two-wire line. This is of particular interest for restraint systems. In this context, the signals are generated via current amplitude modulation. The control unit also supplies the individual sensors via this two-wire line with electrical energy using a direct current. Therefore, there is a powerline data transmission. An 11-bit frame is used for the data transmission, 2 start bits, 8 data bits, and 1 parity bit being provided. Manchester coding is used for the transmission.

SUMMARY

In accordance with an example method of the present invention, different sensors in the motor vehicle, e.g. acceleration, pressure, steering angle, oil quality, and chemical sensors, may be able to be connected to the control unit. Moreover, it may be advantageous for the signals of one sensor, which may also be a sensor cluster, to use a plurality of logical channels that are realized, for example, by time-division multiplexing. This may result in a time and cost advantage in comparison with bus systems. Furthermore, it is possible to reliably and securely transmit information, such as sensor type, manufacturer, measuring ranges, manufacturing date, and serial number.

It may be particularly advantageous for the control unit to check the two-wire line or the energy absorption of the at least one sensor prior to sensor identification. This may ensure that the transmission or the functioning of the sensor is correct. In the case of a fault, the transmission is able to be interrupted in order not to load the control unit with faulty data.

It may also be advantageous for the transmission protocol utilized, the sensor manufacturer, the type of sensor, and sensor manufacturing data of the at least one sensor to be transmitted as the sensor identification data. This may make it possible to clearly identify the sensor, and the control unit is able to take that into consideration when processing the sensory data in that algorithms present for this sensor are used, for example. The manufacturing date, the batch number, a serial number, and inspection results may be used as sensor manufacturing data.

Moreover, it may be advantageous for the sensor identification data to have data words that are each preceded by an identification code. Consequently, the integrity of the transmitted information is secured in the corresponding data word.

It also may be advantageous for the data words to be combined with the corresponding identification code to form an identification block and that the identification block be repeated a predetermined number of times. This may ensure that there is a high probability of the control unit receiving and processing this sensor identification.

The flexibility of the example method of the present invention render it possible to transmit the sensor values with different resolutions, at different transmission rates, and in different logical channels. This may allow the transmission to be implemented in a flexible manner, and it can be adapted as needed. The logical channels may be advantageously realized by time-division multiplexing.

It may also be advantageous for the two bits with the highest value in the actual useful data be used to identify the sensor values.

Finally, it may also be advantageous for a device for implementing the method of the present invention to include is a control unit having a receive module in order to receive the data of the individual sensors via the appropriate two-wire lines the sensors each having a transmit module that enables the transmission via the two-wire lines. If a sensor has more than one sensory design, i.e., it is a sensor cluster, the different sensory data is transmitted via different logical channels to the control unit. This may by realized, for example, by time-division multiplexing. Frequency-division multiplexing is also possible.

BRIEF DESCRIPTION OF THE DRAWINGS

Exemplary embodiments of the present invention are represented in the drawings and are explained in detail in the following description.

FIG. 3 shows an example of sensor identification data.

FIG. 4 shows alternatives for transmitting useful data.

FIG. 5 shows a useful data frame.

FIG. 6 shows the coding of the useful data and status messages.

DETAILED DESCRIPTION

A unidirectional two-wire current interface is used for satellite airbag sensors in order to transmit data from the satellite airbag sensors to a control unit. Different companies use such an interface. In accordance with an example embodiment of the present invention, in order to design this interface to be more flexible and to enable a clear identification of the sensors, the method for transmitting data from at least one sensor to a control unit is expanded such that the at least one sensor transmits a sensor identification to the control unit after receiving the electrical energy from the control unit. This renders it possible to clearly identify the particular sensor so that the control unit is then able to process the sensory data in accordance with this sensor. Therefore, a control unit may have algorithms for processing different sensors. In accordance with the sensor identification, the appropriate algorithm is then used to process the sensor values of the corresponding sensor.

This sensor identification is also ensured in that identification codes precede the corresponding data words. Repeating the sensor identification increases the probability of the control unit correctly receiving the sensor identification. It is now possible for the useful data to be transmitted in different logical channels via a two-wire line, e.g., using time-division multiplexing, and it is also possible to use a different transmission rate as well as resolution for the sensor values. This is then signalized in the sensor identification to ensure correct processing.

Figure 1:
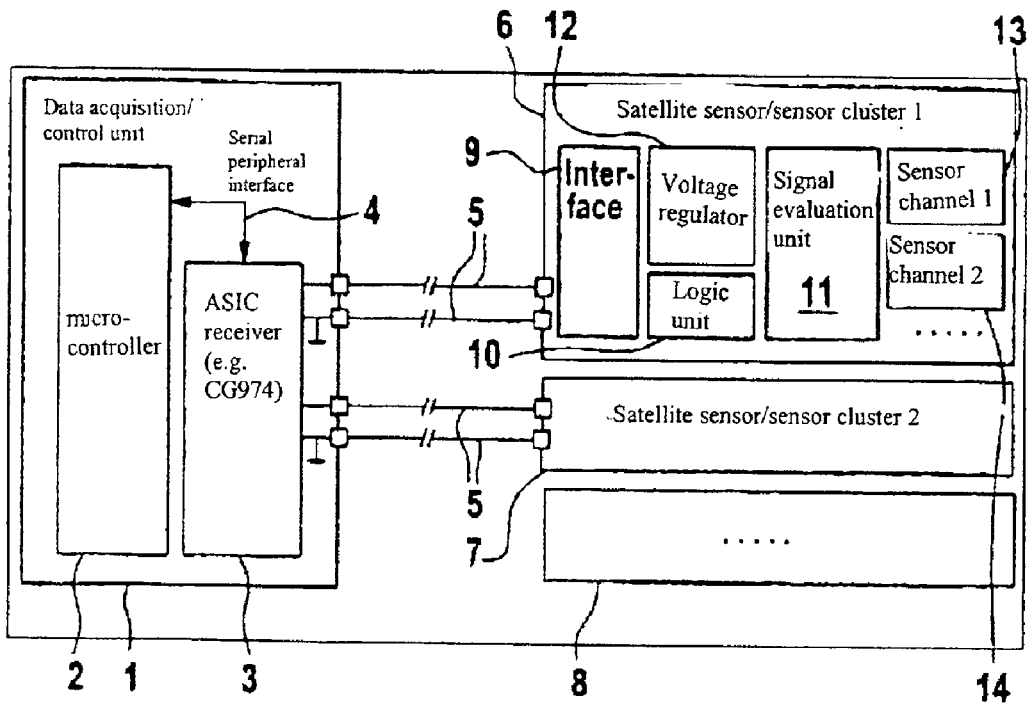
FIG. 1 shows a block diagram of a device according to an example embodiment of the present invention.

FIG. 1 shows the device according to the present invention as a block diagram. A control unit 1 is in each case connected via two-wire lines 5 to sensors 6 and 7. Two satellite sensors are shown in this case. However, more sensors may also be connected to control unit 1 via corresponding two-wire lines assigned to these sensors. Sensors 6 and 7 are designated here as satellite sensors or as sensor clusters. Sensor clusters have more than one sensory design, designated here by a sensor 13 and 14.

Since a satellite sensor 6, 7 is supplied via two-wire lines 5 with electrical energy by a direct current from control unit 1, satellite sensor 6, 7 starts transmitting data immediately after receiving the electrical energy and, in some instances, after checking the two-wire lines and/or the energy absorption. For this purpose, satellite sensor 6 has an interface 9 as a transmit module that is used for transmitting the data via two-wire line 5. Satellite sensor 6, 7 further has a voltage regulator for internal processing, a logic unit for controlling the functional sequence in satellite sensor 6, a signal evaluation unit for processing the sensory data, and sensors 13 and 14, which supply the actual sensory data.

Acceleration sensors, steering angle sensors, pressure sensors, oil quality sensors, and chemical sensor may be used in this instance as sensor types. Other sensor types are also possible. Consequently, there are different sensory designs that since they continuously supply sensory data are transmitted via logical channels by two-wire line 5 to control unit 1.

For receiving the data from individual sensors 6 and 7, control unit 1 has a receive module 3, which is designated here as an ASIC receiver. This receive module 3 is connected via a so-called SPI (serial peripheral interface) line 4 to a microcontroller 2 of control unit 1. SPI line 4 includes five parallel lines, which enable transmission from and to microcontroller 2. Microcontroller 2 then processes the sensory data received via receive module 3 from sensors 6 and 7 in an algorithm, in particular in a triggering algorithm for restraint systems in this instance. Therefore, sensors 13 and 14 are impact sensors, e.g. acceleration or pressure sensors.

Control unit 1 is connected to a restraint system (not shown here). In a triggering case, control unit 1 triggers the restraint system in order to protect the vehicle occupants.

In accordance with the present invention, a method is used when transmitting data from sensors 6 and 7 to control unit 1 that enables the compatibility of different sensors with control unit 1. Moreover, the reliability is increased. This makes it possible for different sensors from different manufacturers to be connected to control unit 1. This renders it possible for appropriate algorithms in the control program of microcontroller 2 to be called up as a function of the particular sensor in order to optimally process the sensory data.

Figure 2:
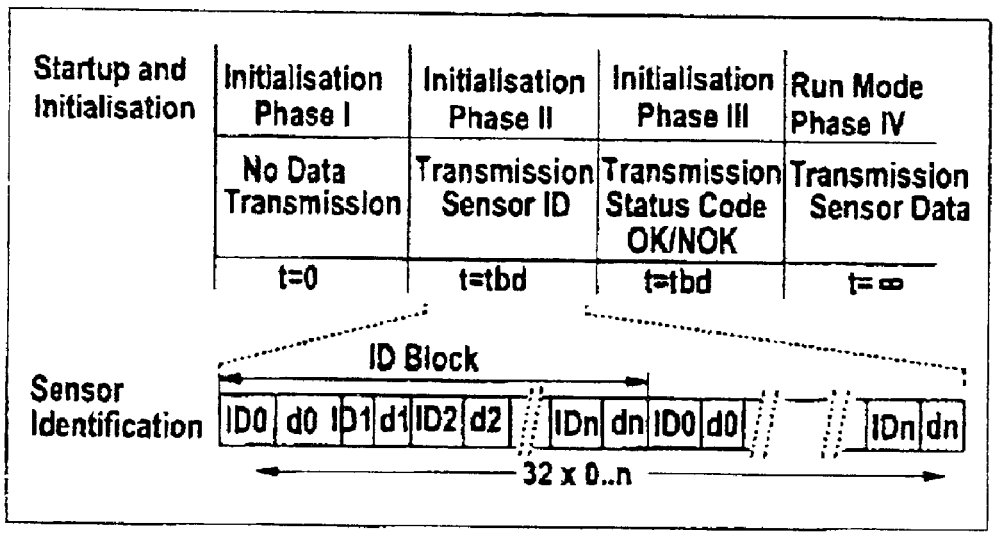
FIG. 2 shows a representation of a method according to an example embodiment of the present invention.

FIG. 2 shows the functional sequence of an example embodiment of the present invention. First, sensor 6, 7 receives its electrical energy via line 5. This occurs at instant T=0.

In initialization phase I, data is not yet sent from sensors 6 and 7 to control unit 1. Control unit 1 checks the energy absorption of individual sensors 6 and 7 here and whether lines 5 are suitable for transmitting data. The energy absorption is important for determining whether particular sensor 6, 7 is functioning correctly.

In initialization phase II, sensors 6 and 7 transmit their respective sensor identifications at the same time yet on separate lines 5. As shown in FIG. 2, the sensor identification has an identification block including data words D0 through Dn as well as identification codes ID0 though IDn. The identification codes are used for the data integrity. The sensor identification data is in individual data words D0 through Dn. As shown in FIG. 2, the identification block is repeated 32 times.

FIG. 3 shows by way of example which data is able to be transmitted in data words D0 through Dn. The information transmission format is stored in field 1 using a data word length of 1. That means that the protocol, the length of the identification block, and the identification or useful data formats are transmitted in this instance. The manufacturer identification, i.e., the sensor or chip manufacturer, is then coded in field 2 using the length of one data word. The sensor family is then specified in field 3 using the length of one data word, e.g., the sensor type, i.e., whether the sensor is an acceleration sensor, a pressure sensor, or a steering angle sensor.

The actual sensor identification is transmitted in field 4 using a predefined number of data words. This means the sensor type, i.e., the measuring region, the sensing axis, and other data related to the measurement. In field 5, using a predefined number of data words, the sensor status is transmitted, i.e., how far along the production progress is and whether there is a good or bad identification. Finally, the sensor information, i.e., the manufacturing date, the batch number, or a serial number, is transmitted in field 6 using a certain number of data words. Additional information is codable in this instance. The sequence and the length of the information may also be changed in accordance with the requirements.

In FIG. 2, a transmission is made in initialization phase III regarding the status code of sensor 6, 7, i.e., whether the sensor is functioning or not. The actual sensory data acquired by sensory designs 13 and 14 is transmitted in run mode phase IV.

In accordance with the example embodiment of the present invention, different possibilities for transmission are provided here. FIG. 4 shows examples of such alternatives. In the case of type A1, only one channel and a resolution of 10 bits are used, so that a data rate of 1 kHz is available. This renders possible a high data rate, e.g., for peripheral acceleration sensors (PAS 4) or also for satellite pressure sensors. Type B1 also uses only one channel, yet a higher resolution of 12 to 16 bits for the useful data, so that only one data rate of 2 kHz is available. This may be used for sensors necessitating a high resolution, i.e., for an inclination sensor or a displacement sensor.

In the case of type A2, two channels are used in time-division multiplex, so that only one resolution of 8 bits and one data rate of 2 kHz are possible. This then renders possible two-channel transmission, i.e., as in our case for sensors 12 and 14 via a two-wire line 5.

Type B2 also uses two channels having a high resolution of 12 to 16 bits, yet only one data rate of 1 kHz is possible. Consequently, two-channel transmission with high resolution is made possible, e.g. when a rotation-rate sensor and a sensor for low acceleration are combined in a sensor cluster.

In the case of type A4, 4 channels are used, each having a resolution of 8 bits and a data rate of 1 kHz, so that four-channel transmission results, e.g., for a sensor cluster for measuring temperature, moisture, and pressure.

FIG. 5 shows an example of a useful data frame. The frame is 13 bits long and starts with two start bits S1 and S2. Ten bits of useful data then follow, the bits having the highest value identifying the type of the useful data. The frame is closed by a parity bit. The length of the frame is selected here with 104 microseconds. The data throughput is determined by rate of repetition Trep.

FIG. 6 shows an example of how using the existing 8 bits, the useful data and status messages, which also include the identification data, are coded with the available codings. The greatest range of values from +/−480 is used for coding the useful data, while the remaining coding possibilities up to +/−512 are used in decimal form for the status messages.

Figure 7:
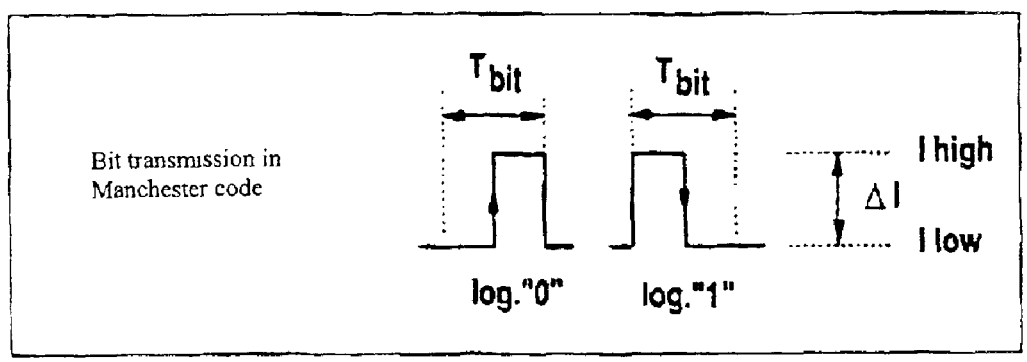
FIG. 7 shows the bit transmission in Manchester code.

The data is transmitted here in Manchester code as shown in FIG. 7. The Manchester coding stands out in that for the bit detection, an edge change is detected in the temporal middle of the respective bit. A logical 0 is characterized in this instance by an increasing edge from a low level to a high level, while a logical 1 is characterized by a decreasing edge from a high level to a low level.

What is claimed is:

1. A method for transmitting data from at least one sensor to a control unit, a respective two-wire line being used for each sensor for unidirectionally transmitting the data on a first wire and for receiving current on a second wire, whereby a unidirectional two-wire current interface is provided, the method comprising:

receiving, by the at least one sensor, electrical energy from the control unit via the second wire of the line, the electrical energy being electrical energy necessary for operation of the at least one sensor; and continuously and unidirectionally transmitting by the at least one sensor, a sensor identification, a status identification, and sensor values as data on the first wire of the line to the control unit after receiving the electrical energy.

2. The method as recited in claim 1, further comprising:

checking, by the control unit, at least one of the respective line and energy absorption of the at least one sensor prior to sensor identification.

3. The method as recited in claim 1, wherein a used transmission protocol, a sensor type, and sensor manufacturing data of the at least one sensor are transmitted as the sensor identification.

4. The method as recited in claim 1, wherein data words each a corresponding identification code, are transmitted as the sensor identification.

5. The method as recited in claim 4, wherein the data words are combined with the corresponding identification code to form an identification block, and the identification block is repeatedly transmitted to the control unit a predefined number of times.

6. The method as recited in claim 1, wherein the sensor values are transmitted in a resolution predefined for the at least one sensor.

7. The method as recited in claim 1, wherein the sensor values of the at least one sensor are transmitted in time-division multiplex, so that at least two logical channels are available for transmitting the sensor values.

8. The method as recited in claim 1, wherein the sensor values have fields that render it possible to identify the sensor values.

9. The method as recited in claim 8, wherein highest-value bits of the sensors are used as the fields for identifying the sensor values.

10. A device for transmission of data, comprising:

a control unit; and at least one sensor, each of the at least one sensor connected to the control unit via a two-wire line allocated to the sensor, a first wire of the line supplying current to the at least one sensor;

wherein the control unit includes at least one of a receive module configured to receive data from the at least one sensor, and a sensor transmit module configured to transmit the data to the control unit, the data including a sensor identification, a status identification, and sensor values, the at least one sensor configured to continuously and unidirectionally transmit the data on a second wire of the line after receiving energy necessary for operation of the at least one sensor from the control unit via the first wire of the line.

11. The sensor as recited in claim 10, wherein the at least one sensor has more than one sensory design, one logical channel being assigned to each sensory design for transmitting to the control unit.

* * * * *